(12) United States Patent
Taki et al.

(10) Patent No.: US 11,240,482 B2
(45) Date of Patent: Feb. 1, 2022

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Yuhei Taki, Kanagawa (JP); Soichiro Inatani, Tokyo (JP); Hiro Iwase, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/764,217

(22) PCT Filed: Aug. 30, 2018

(86) PCT No.: PCT/JP2018/032247
§ 371 (c)(1),
(2) Date: May 14, 2020

(87) PCT Pub. No.: WO2019/102676
PCT Pub. Date: May 31, 2019

(65) Prior Publication Data
US 2020/0396438 A1 Dec. 17, 2020

(30) Foreign Application Priority Data

Nov. 21, 2017 (JP) .............................. JP2017-223491

(51) Int. Cl.
*H04N 13/194* (2018.01)
*H04N 13/167* (2018.01)
*G02B 27/00* (2006.01)
*G06F 3/01* (2006.01)

(52) U.S. Cl.
CPC ........ *H04N 13/194* (2018.05); *G02B 27/0093* (2013.01); *G06F 3/013* (2013.01); *H04N 13/167* (2018.05)

(58) Field of Classification Search
CPC .............. H04N 13/194; H04N 13/167; G02B 27/0093; G06F 3/013
See application file for complete search history.

(56) References Cited

U.S. PATENT DOCUMENTS

2017/0150230 A1* 5/2017 Shimura ............. G06F 3/04815

FOREIGN PATENT DOCUMENTS

| JP | 2002-149581 | * | 5/2002 | ............. G06F 13/00 |
| JP | 2002-279449 | * | 9/2002 | |

* cited by examiner

*Primary Examiner* — Mishawn N. Hunter
(74) *Attorney, Agent, or Firm* — Paratus Law Group, PLLC

(57) ABSTRACT

There is provided an information processing device, an information processing method, and a computer program that can improve comfortability at the time when a plurality of users share and view a three-dimensional image. The information processing device includes a control unit configured to perform control for determining a transmission starting point of three-dimensional image information based on positional information and sight line information of a first user, positional information and sight line information of a second user, and display position information of the three-dimensional image information that is shared and viewed by the first user and the second user.

13 Claims, 11 Drawing Sheets

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2018/032247 (filed on Aug. 30, 2018) under 35 U.S.C. § 371, which claims priority to Japanese Patent Application No. 2017-223491 (filed on Nov. 21, 2017), which are all hereby incorporated by reference in their entirety.

FIELD

The present disclosure relates to an information processing device, an information processing method, and a computer program.

BACKGROUND

In recent years, due to development of information processing techniques and communication techniques, there have been developed augmented reality (AR) and virtual reality (VR) environments in which people can have a real bodily sensation of a virtual world.

For example, the following Patent Literature 1 discloses a technique related to what is called AR for superimposing and displaying a display object on a real space that may be viewed via a transmissive head mounted display (HMD).

CITATION LIST

Patent Literature

Patent Literature 1: JP 2017-120550 A

SUMMARY

Technical Problem

However, in a case of trying to view a massive 3D model having high resolution or including an animation, download of model data cannot keep up with viewing and a long waiting time is generated, so that it is difficult to perform comfortable viewing. Especially in a case of viewing a common 3D model (three-dimensional image) by a plurality of users at the same time, free communication related to the 3D model is inhibited during the waiting time for download.

Thus, the present disclosure provides an information processing device, an information processing method, and a computer program that can improve comfortability at the time when a plurality of users share and view a three-dimensional image.

Solution to Problem

According to the present disclosure, an information processing device is provided that includes: a control unit configured to perform control for determining a transmission starting point of three-dimensional image information based on positional information and sight line information of a first user, positional information and sight line information of a second user, and display position information of the three-dimensional image information that is shared and viewed by the first user and the second user.

According to the present disclosure, an information processing method performed by a processor is provided that includes: performing control for determining a transmission starting point of three-dimensional image information based on positional information and sight line information of a first user, positional information and sight line information of a second user, and display position information of the three-dimensional image information that is shared and viewed by the first user and the second user.

According to the present disclosure, a computer program is provided that causes a computer to function as a control unit configured to perform control for determining a transmission starting point of three-dimensional image information based on positional information and sight line information of a first user, positional information and sight line information of a second user, and display position information of the three-dimensional image information that is shared and viewed by the first user and the second user.

Advantageous Effects of Invention

As described above, according to the present disclosure, it is possible to improve comfortability at the time when a plurality of users share and view a three-dimensional image.

The effects described above are not necessarily limiting, and any one of the effects described in the present description or another effect that may be grasped from the present description may be exhibited in addition to or in place of the effects described above.

DESCRIPTION OF EMBODIMENTS

Figure 1:
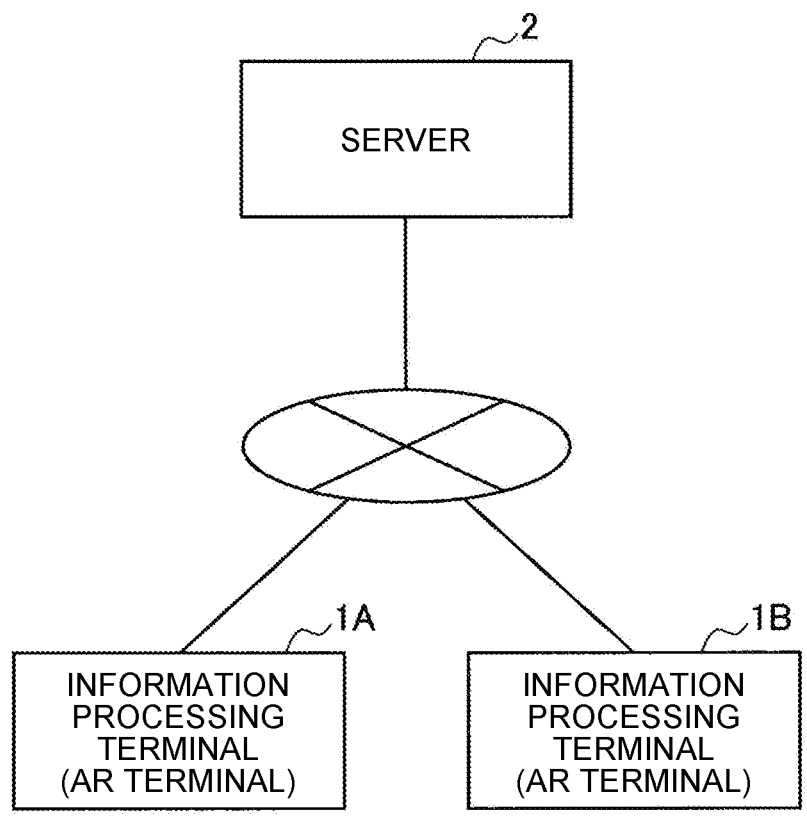
FIG. 1 is a diagram for explaining an outline of an information processing system according to one embodiment of the present disclosure.

The following describes a preferred embodiment of the present disclosure in detail with reference to the attached drawings. In the present description and the drawings, constituent elements having substantially the same functional configuration are denoted by the same reference numerals, and redundant description will not be repeated.

The description will be made in the following order.
1. Outline of information processing system according to one embodiment of present disclosure
2. Configuration
2-1. Configuration of information processing terminal 1
2-2. Configuration of server 2
3. Operation processing
4. Hardware configuration
5. Conclusion

1. Outline of Information Processing System According to One Embodiment of Present Disclosure FIG. 1 is a diagram for explaining an outline of an information processing system according to one embodiment of the present disclosure. As illustrated in FIG. 1, the information processing system according to the present embodiment includes a server 2, an information processing terminal 1A, and an information processing terminal 1B.

The information processing terminal 1 is what is called an augmented reality (AR) terminal, specifically, for example, a spectacle-type wearable device that performs control for displaying a virtual object on a transmissive display unit to seem be superimposed on a real space to implement augmented reality.

Background

Assumed is a case in which a user A wearing the information processing terminal 1A and a user B wearing the information processing terminal 1B are present in the same space, and share and view the same virtual object based on data received from the server 2. In a case in which a plurality of users view a common virtual object at the same time and communicate with each other at a present place, a waiting time is generated when it takes time to download data, and free communication between the users is inhibited.

Especially in a case of displaying 3D model data (three-dimensional image information) and the like, which is higher-definition and larger-volume data as compared with 2D data, a data amount is very large, so that the user is caused to wait for a long time with a method of simply displaying the data after the entire data is completely downloaded from the server 2, and comfort AR experience may be inhibited.

Thus, in the present embodiment, by determining a download starting point so that a portion that can be viewed from the users is preferentially downloaded based on positions and sight line directions of the users, the waiting time is reduced to enable comfort viewing without causing a difference in viewing statuses of the users, and viewing experience is enabled to be improved. The users can immediately start to freely communicate with each other on a common portion that starts to be viewed by themselves.

The information processing system according to one embodiment of the present disclosure has been described above. The following describes a specific configuration of each device included in the information processing system according to the present embodiment with reference to the drawings.

2. Configuration

2-1. Configuration of Information Processing Terminal 1

Figure 2:
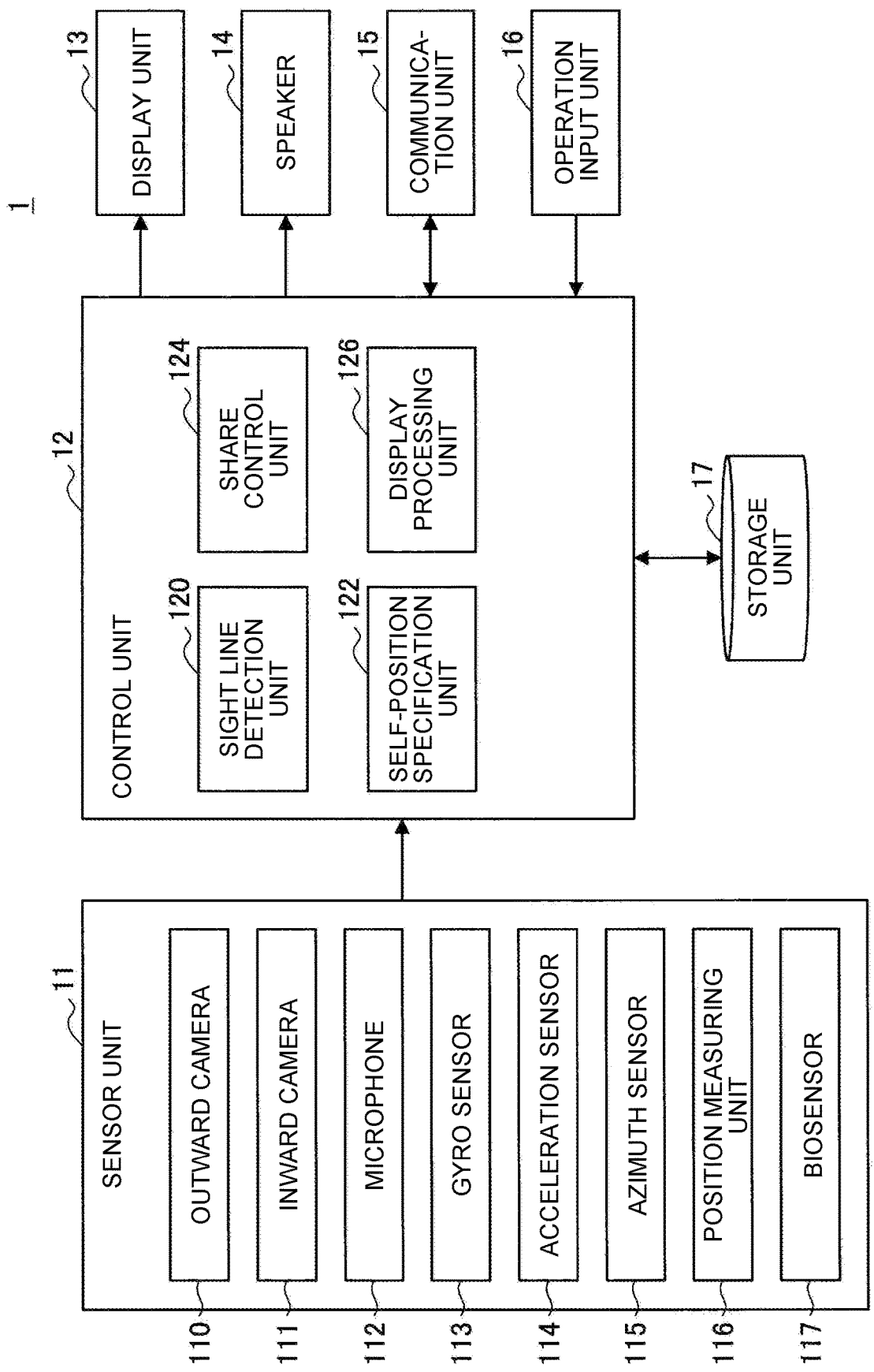
FIG. 2 is a block diagram illustrating an example of a configuration of an information processing terminal according to the present embodiment.

FIG. 2 is a block diagram illustrating an example of a configuration of the information processing terminal 1 according to the present embodiment. As illustrated in FIG. 2, the information processing terminal 1 includes a sensor unit 11, a control unit 12, a display unit 13, a speaker 14, a communication unit 15, an operation input unit 16, and a storage unit 17.

Sensor Unit 11

The sensor unit 11 has a function of acquiring various kinds of information about the user or a peripheral environment. For example, the sensor unit 11 includes an outward camera 110, an inward camera 111, a microphone 112, a gyro sensor 113, an acceleration sensor 114, an azimuth sensor 115, a position measuring unit 116, and a biosensor 117. A specific example of the sensor unit 11 described herein is merely an example, and the present embodiment is not limited thereto. The number of the respective sensors may be plural.

The specific example of the sensor unit 11 illustrated in FIG. 2 is exemplified as a preferred example, but all components thereof are not necessarily provided. For example, the sensor unit 11 may have a configuration including part of the specific example of the sensor unit 11 illustrated in FIG. 2 such as a configuration including only the outward camera 110, the acceleration sensor 114, and the position measuring unit 116, or may further include another sensor.

Each of the outward camera 110 and the inward camera 111 includes a lens system constituted of an imaging lens, a diaphragm, a zoom lens, a focus lens, and the like, a driving system that causes the lens system to perform a focus operation and a zoom operation, a solid-state imaging element array that performs photoelectric conversion on imaging light obtained by the lens system to generate an imaging signal, and the like. The solid-state imaging element array may be implemented, for example, by a charge coupled device (CCD) sensor array or a complementary metal oxide semiconductor (CMOS) sensor array.

In the present embodiment, an angle of view and orientation of the outward camera 110 are preferably set to image a region corresponding to a field of vision of the user in the real space.

The microphone 112 collects a voice of the user and a surrounding environmental sound to be output to the control unit 12 as voice data.

The gyro sensor 113 is, for example, implemented by a triaxial gyro sensor, and detects an angular speed (rotational speed).

The acceleration sensor 114 is, for example, implemented by a triaxial acceleration sensor (also referred to as a G sensor), and detects acceleration at the time of movement.

The azimuth sensor 115 is, for example, implemented by a triaxial geomagnetic sensor (compass), and detects an absolute direction (azimuth).

The position measuring unit 116 has a function of detecting a current position of the information processing terminal 1 based on a signal acquired from the outside. Specifically, for example, the position measuring unit 116 is implemented by a Global Positioning System (GPS) measuring unit, and receives radio waves from GPS satellites, detects a position at which the information processing terminal 1 is present, and outputs the detected positional information to the control unit 12. The position measuring unit 116 may also detect the position via Wi-Fi (registered trademark), Bluetooth (registered trademark), transmission/reception to/from a cellular telephone, a PHS, a smartphone, and the like, short-range communication, or the like in addition to the GPS, for example.

The biosensor 117 detects biological information of the user. Specifically, for example, the biosensor 117 may detect a heartbeat, a body temperature, sweating, a blood pressure, sweating, a pulse, respiration, nictitation, an eye movement, a gazing time, a size of pupil diameter, a blood pressure, brain waves, a body motion, a posture, a skin temperature, electric skin resistance, micro vibration (MV), myoelectric potential, blood oxygen saturation (SPO2), or the like.

Control Unit 12

The control unit 12 functions as an arithmetic processing unit and a control device, and controls the entire operations in the information processing terminal 1 in accordance with various computer programs. The control unit 12 may be implemented by an electronic circuit such as a central processing unit (CPU) and a microprocessor, for example. The control unit 12 may also include a read only memory (ROM) that stores a computer program to be used, an arithmetic parameter, and the like, and a random access memory (RAM) that temporarily stores a parameter and the like that vary as appropriate.

The control unit 12 according to the present embodiment controls starting or stopping of each configuration, for example. The control unit 12 can also input a control signal to the display unit 13 and the speaker 14. As illustrated in FIG. 2, the control unit 12 according to the present embodiment may also function as a sight line detection unit 120, a self-position specification unit 122, a share control unit 124, and a display processing unit 126.

The sight line detection unit 120 detects sight line information of the user based on sensor data acquired by the sensor unit 11. Specifically, for example, the sight line detection unit 120 analyzes orientation of a face of the user or a gazing position based on the sensor data acquired by the outward camera 110, the inward camera 111, the gyro sensor 113, the acceleration sensor 114, or the azimuth sensor 115 included in the sensor unit 11, and detects the sight line direction of the user as the sight line information. The detected sight line information is transmitted from the communication unit 15 to the server 2 by the control unit 12.

The self-position specification unit 122 specifies a three-dimensional position of the information processing terminal 1, that is, a three-dimensional position of the user wearing the information processing terminal 1 based on the sensor data acquired by the sensor unit 11. Specifically, for example, the self-position specification unit 122 may specify a self-position based on the positional information acquired by the position measuring unit 116 included in the sensor unit 11. The self-position specification unit 122 may also recognize a three-dimensional space based on the sensor data acquired by the sensor unit 11 to specify the self-position. The specified self-position is transmitted from the communication unit 15 to the server 2 by the control unit 12.

The share control unit 124 performs control for sharing the 3D model data with the other information processing terminal that shares and views the same 3D model data. Specifically, the share control unit 124 performs control for transmitting the 3D model data received from the server 2 to the information processing terminal of a sharing person. The share control unit 124 may also perform control for receiving the 3D model data from the information processing terminal of the sharing person.

The display processing unit 126 performs processing of displaying the 3D model data on the display unit 13. Specifically, the display processing unit 126 displays the 3D model data that is received from the server 2 via the communication unit 15 and the 3D model data received from the information processing terminal of the sharing person at a designated display position (a three-dimensional position in the real space).

Display Unit 13

The display unit 13 is, for example, implemented by a lens unit (an example of a transmissive display unit) that performs display using a hologram optical technique, a liquid crystal display (LCD) device, an organic light emitting diode (OLED) device, and the like. The display unit 13 may be a transmissive type, a transflective type, or a non-transmissive type.

Speaker 14

The speaker 14 reproduces a voice signal in accordance with control by the control unit 12.

Communication Unit 15

The communication unit 15 is a communication module for transmitting/receiving data to/from another device in a wired/wireless manner. For example, the communication unit 15 wirelessly communicates with an external apparatus directly or via a network access point using a scheme such as a wired local area network (LAN), a wireless LAN, Wireless Fidelity (Wi-Fi, registered trademark), infrared communication, Bluetooth registered trademark), short distance/non-contact communication, and a portable communication network (Long Term Evolution (LTE), third-generation mobile object communication scheme (3G)).

Operation Input Unit 16

The operation input unit 16 is implemented by an operation member having a physical structure such as a switch, button, or a lever.

Storage Unit 17

The storage unit 17 is implemented by a read only memory (ROM) that stores a computer program, an arithmetic parameter, and the like used for the processing performed by the control unit 12 described above, and a random access memory (RAM) that temporarily stores a parameter and the like that vary as appropriate. The storage unit 17 according to the present embodiment may store various kinds of sensor information, a recognition result, and connection information, for example.

The configuration of the information processing terminal 1 according to the present embodiment has been specifically described above. The configuration that has been described above with reference to FIG. 2 is merely an example, and the functional configuration of the information processing terminal 1 according to the present embodiment is not limited thereto.

For example, the information processing terminal 1 according to the present embodiment does not necessarily include the entire configuration illustrated in FIG. 2. The information processing terminal 1 may have a configuration not including the microphone 112 or the biosensor 117, for example. The information processing terminal 1 may be constituted of a plurality of devices. For example, the information processing terminal 1 may be constituted of a spectacle-type wearable terminal worn by the user, a wearable terminal such as a smart band, a smartphone, and the like. At least part of the sensor unit 11 may be a surrounding environmental sensor (for example, a surveillance camera, a microphone, an infrared sensor, an ultrasonic sensor, and the like disposed in a room).

For example, at least part of the function of the control unit 12 of the information processing terminal 1 may be present in another device that is connected thereto for communication via the communication unit 15. For example, at least part of the function of the control unit 12 of the information processing terminal 1 may be provided to an intermediate server, a cloud server on the Internet, or the like. Alternatively, the configuration may be such that a level of processing performed by the control unit 12 is caused to be simple, and high-level processing is performed by an external device, for example, another mobile device such as a smartphone owned by the user, a home server, an edge server, an intermediate server, or a cloud server. By distributing the processing to a plurality of devices, a load can be reduced. By performing processing in the information processing terminal 1 or by an external device (for example, another mobile device, a home server, an edge server, and the like) having a communication distance relatively close to the information processing terminal 1, real-time performance can be improved and security can be secured.

The functional configuration of the information processing terminal 1 according to the present embodiment can be flexibly modified in accordance with specifications and operations.

2-2. Configuration of Server 2

Figure 3:
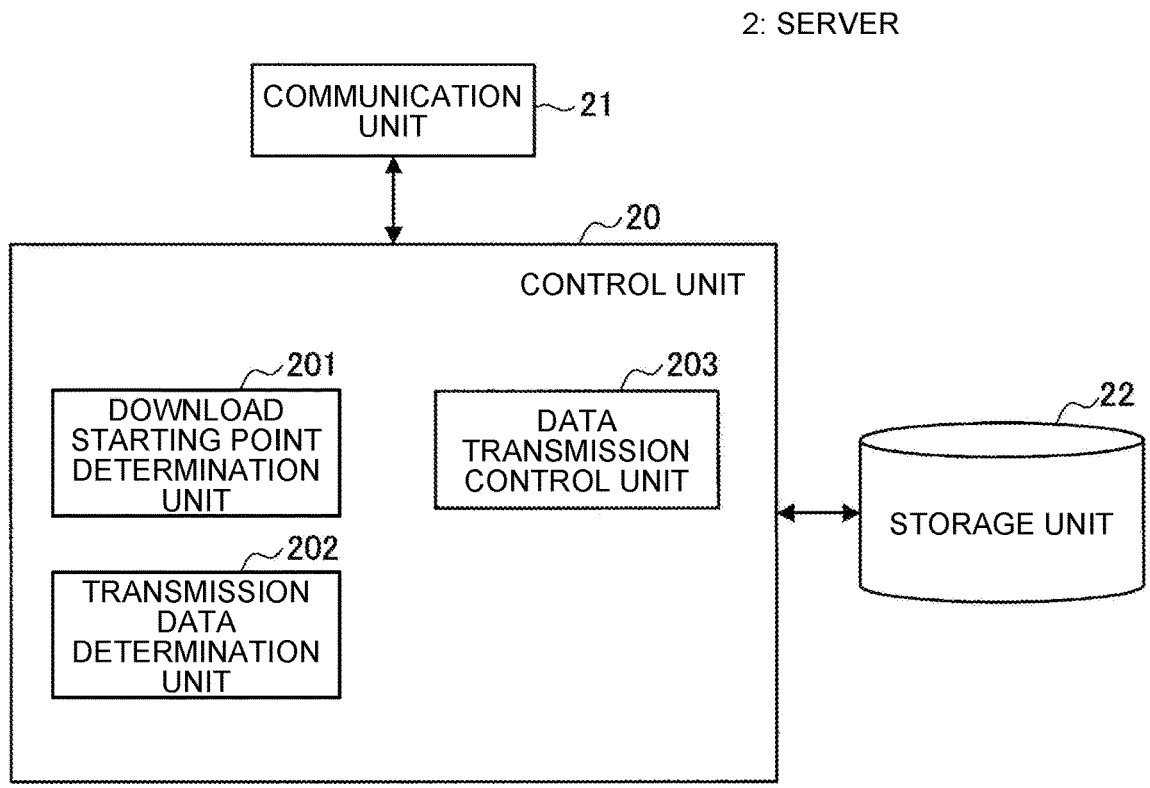
FIG. 3 is a block diagram illustrating an example of a configuration of a server according to the present embodiment.

FIG. 3 is a block diagram illustrating an example of a configuration of the server 2 according to the present embodiment. As illustrated in FIG. 3, the server 2 (information processing device) includes a control unit 20, a communication unit 21, and a storage unit 22.

Control Unit 20

The control unit 20 functions as an arithmetic processing device and a control device, and controls the entire operation in the server 2 in accordance with various computer programs. The control unit 20 is, for example, implemented by an electronic circuit such as a central processing unit (CPU) and a microprocessor. The control unit 20 may also include a read only memory (ROM) that stores a computer program to be used, an arithmetic parameter, and the like, and a random access memory (RAM) that temporarily stores a parameter and the like that vary as appropriate.

The control unit 20 according to the present embodiment also functions as a download starting point determination unit 201, a transmission data determination unit 202, and a data transmission control unit 203.

The download starting point determination unit 201 determines a download starting point of the 3D model data (that is, a transmission starting point of three-dimensional image information) in response to a request to download the 3D model data from the information processing terminal 1. Specifically, the download starting point determination unit 201 determines the download starting point that is common to the users based on the positions and the sight line information of the users received from a plurality of the information processing terminals 1 and the display position of the 3D model data of interest (three-dimensional position in the real space). For example, the download starting point determination unit 201 estimates gazing points of the respective users in a case in which the users see the same 3D model data, and determines a centroid of the gazing points to be the download starting point. The gazing point is a point at which the sight line direction intersects with a size outline FIG. 32. The download starting point determination unit 201 may determine a center of a region of the 3D model data that can be viewed by the users to be the download starting point. The download starting point is not limited to a strict point, and may include, for example, a plane. Details about determination processing for the download starting point according to the present embodiment will be described later.

The transmission data determination unit 202 determines pieces of data to be transmitted to the information processing terminals 1 that have made requests among pieces of the 3D model data of interest based on the determined download starting point. For example, the transmission data determination unit 202 may determine data in a predetermined region centered on the download starting point, or may determine parts including the download starting point (for example, in a case of 3D model data of a vehicle, a tire, a hood, a bumper, and the like). In the present embodiment, the 3D model data is successively transmitted preferentially from the determined download starting point, so that the transmission data determination unit 202 determines a download progressing direction, and also determines transmission data to be transmitted next among pieces of the 3D model data of interest. For example, the transmission data determination unit 202 may uniformly widen a transmission range radially from the download starting point, or may widen the transmission range for every adjacent parts. The transmission data determination unit 202 successively transmits the rest pieces of the 3D model data (data in the periphery of the download starting point) for a certain time under a certain condition. For example, in a case in which the user moves and the sight line direction is largely changed, the download starting point is updated, so that the transmission data determination unit 202 determines the transmission data from among the pieces of 3D model data that have not been transmitted based on a new download starting point.

In a case of causing the information processing terminals 1 to share the same 3D model data, the transmission data determination unit 202 calculates allocation of data amount, and determines the transmission data for each of the information processing terminals 1. By causing the information processing terminals 1 to share the 3D model data, it is possible to prevent the same data from being transmitted to the information processing terminals 1, so that a load of transmission processing performed by the server 2 is reduced, and a data band can be prevented from being occupied for a long time.

The data transmission control unit 203 performs control for transmitting the data determined by the transmission data determination unit 202 from the communication unit 21 to the information processing terminal 1.

Communication Unit 21

The communication unit 21 is connected to a network in a wired or wireless manner, and transmits/receives data to/from each of the information processing terminals 1 via the network. The communication unit 21 is, for example, connected to the information processing terminal 1 for communication via a wired/wireless local area network (LAN), Wireless Fidelity (Wi-Fi, registered trademark), or the like.

Storage Unit 22

The storage unit 22 is implemented by a ROM that stores a computer program, an arithmetic parameter, and the like used for processing performed by the control unit 20, and a RAM that temporarily stores a parameter and the like that vary as appropriate. For example, the storage unit 22 according to the present embodiment stores the 3D model data and user information. The user information includes self-position information and the sight line information transmitted from the information processing terminal 1. The storage unit 22 may also accumulate a history of the user who has viewed the 3D model data (a viewing history and an operation history. The viewing history includes a history of the position and the sight line direction at the time of viewing) in association with the 3D model data.

The configuration of the server 2 according to the present embodiment has been specifically described above. The configuration of the server 2 illustrated in FIG. 3 is merely an example, and the present embodiment is not limited thereto. For example, at least part of the configuration of the server 2 may be disposed in an external device, or at least part of the functions of the control unit 20 may be implemented by the information processing terminal 1 or an information processing device having a communication distance relatively close to the information processing terminal 1 (for example, what is called an edge server). By distributing the configuration of the server 2 as appropriate, real-time performance can be improved and a processing load can be reduced.

Regarding Determination of Download Starting Point of 3D Model Data

The following describes determination processing for the download starting point performed by the download starting point determination unit 201 described above using a specific example.

First Determination Method

Figure 4:
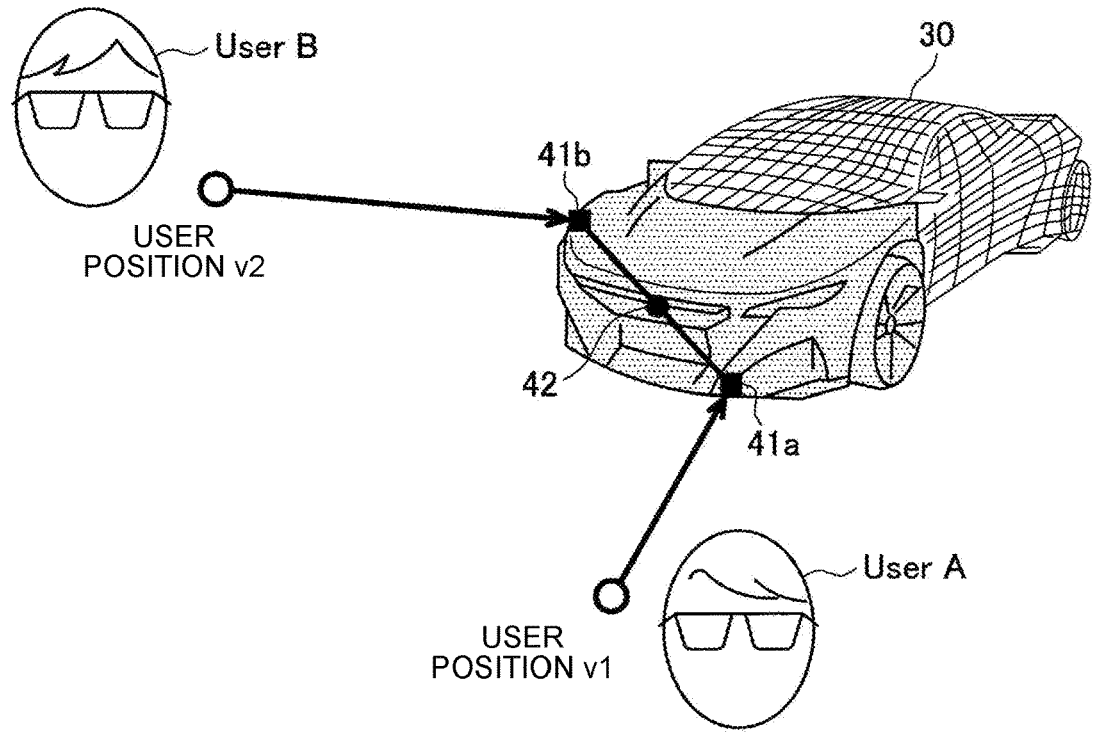
FIG. 4 is a diagram for explaining an outline of a first determination method for a download starting point according to the present embodiment.

FIG. 4 is a diagram for explaining an outline of a first determination method for the download starting point according to the present embodiment. As illustrated in FIG. 4, the download starting point determination unit 201 may estimate gazing points 41*a* and 41*b* on the 3D model of each user based on positions v1 and v2 and sight line directions of the users who share and view the same 3D model data 30 and a display position of the 3D model data 30 in the real space, and determine a centroid thereof (user reference point 42) to be the download starting point. In this case, data in the periphery of the download starting point (user reference point 42) is preferentially downloaded and displayed, so that download of a portion that can be viewed by the user A and the user B is firstly completed and high-definition 3D model data is displayed. The download starting point determination unit 201 may make it a condition that the users are close to each other in some degree.

Figure 5:
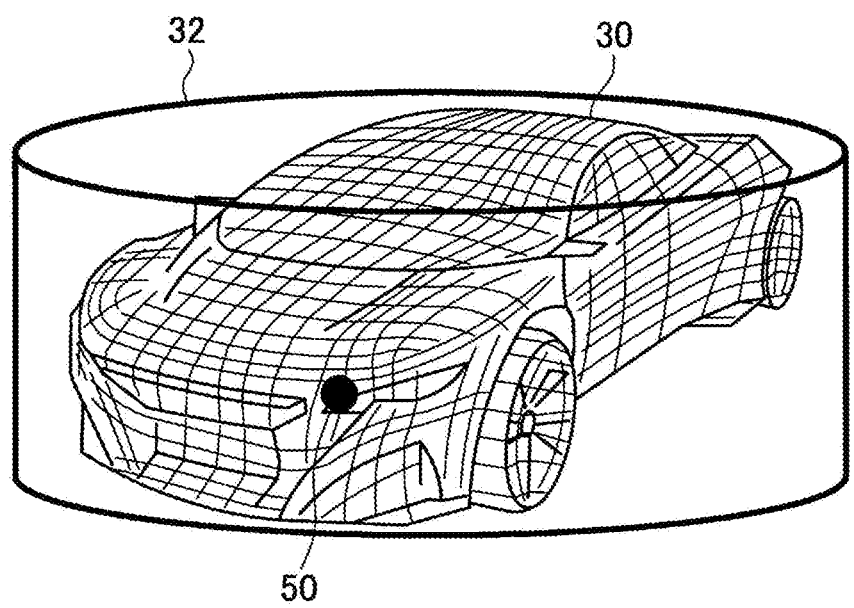
FIG. 5 is a diagram for explaining size outline information of 3D model data according to the present embodiment.
Figure 6:
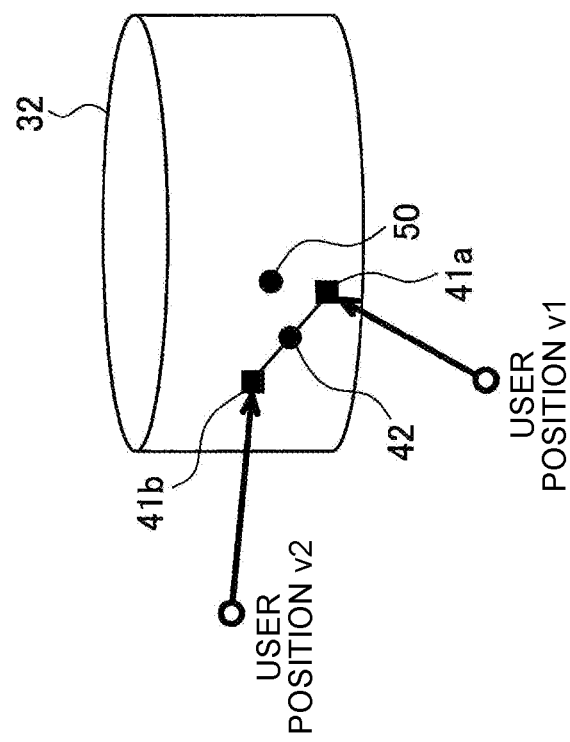
FIG. 6 is a diagram for explaining determination of the download starting point by referring to a size outline figure and a reference point in the first determination method for the download starting point according to the present embodiment.

The following describes the first determination method in detail with reference to FIG. 5 and FIG. 6.

First, the following describes information included in the 3D model data according to the present embodiment with reference to FIG. 5. FIG. 5 is a diagram for explaining size outline information of the 3D model data. As illustrated in FIG. 5, the 3D model data according to the present embodiment includes information (including size information of a radius and a size of the 3D model data) of the size outline FIG. 32 having a simple shape (for example, a cone, a cylinder, or a sphere) representing a schematic shape of the 3D model data 30. The size outline FIG. 32 has a smaller data amount than that of the high-definition 3D model data 30.

To the 3D model data, a reference point 50 for download is set. The reference point 50 for download may be set on the size outline FIG. 32, or on the 3D model data 30. The reference point 50 is a predetermined preferential point such as an important portion or a portion desired to be viewed of the 3D model data, and may be set in advance by a creator of the 3D model data. Alternatively, the reference point 50 may be a front direction (the direction may be set by the creator at the time of creation) of the 3D model data 30, and may be automatically set. The reference point 50 may be disposed inside the 3D model data. For example, in a case in which the 3D model data is "house", an interior inside the house may be important, so that the reference point 50 for download may be disposed at a portion at which a door is opened or a portion viewed through a window, for example.

Additionally, the 3D model data may have a flag indicating whether the data can be rotated. For example, in a case in which the 3D model data is "vehicle" and displayed on a road in the real space, if "vehicle" is rotated horizontally or vertically to be displayed, a display direction of the vehicle with respect to the road becomes strange, so that a flag indicating that the data cannot be rotated is assumed to be set. However, depending on content of the model data or a display environment, rotational display of the 3D model data at the time of display may be previously allowed by the creator and the like.

The download starting point determination unit 201 according to the present embodiment determines the download starting point by referring to the size outline information and the reference point of the 3D model data described above. FIG. 6 is a diagram for explaining determination of the download starting point by referring to the size outline FIG. 32 and the reference point 50 in the first determination method for the download starting point according to the present embodiment.

As illustrated in FIG. 6, the download starting point determination unit 201 estimates the gazing points 41*a* and 41*b* on the size outline FIG. 32 of the 3D model data 30 based on the positions and the sight line directions of the users and the display position of the 3D model data 30. Alternatively, the size outline FIG. 32 of the 3D model data 30 may be transmitted to the information processing terminal 1 side, and the gazing point 41 may be estimated on the information processing terminal 1 side.

Subsequently, the download starting point determination unit 201 obtains the centroid of the gazing points 41*a* and 41*b* (hereinafter, referred to as the user reference point 42). The download starting point determination unit 201 then rotates the 3D model data so that a distance between the reference point 50 and the user reference point 42 defined on the 3D model data becomes minimum, and determines an apex on the 3D model data closest to the reference point 50 or the user reference point 42 to be the download starting point in a rotated state. Due to this, the users can preferentially share a portion more important for viewing experience to start to comfortably view the data.

In a case in which a flag indicating that the data cannot be rotated is set to the 3D model data, the download starting point determination unit 201 may determine apex coordinates on the 3D model data closest to the user reference point 42 to be the download starting point in a state of not rotating the 3D model data. Due to this, the users can share the 3D model data and start to comfortably view the 3D model data. Also in a case in which a rotation flag is not set, or in a case in which a flag indicating that the data can be rotated is set, apex coordinates on the 3D model data closest to the user reference point 42 may be determined to be the download starting point in a state of not rotating the 3D model data.

Second Determination Method

Figure 7:
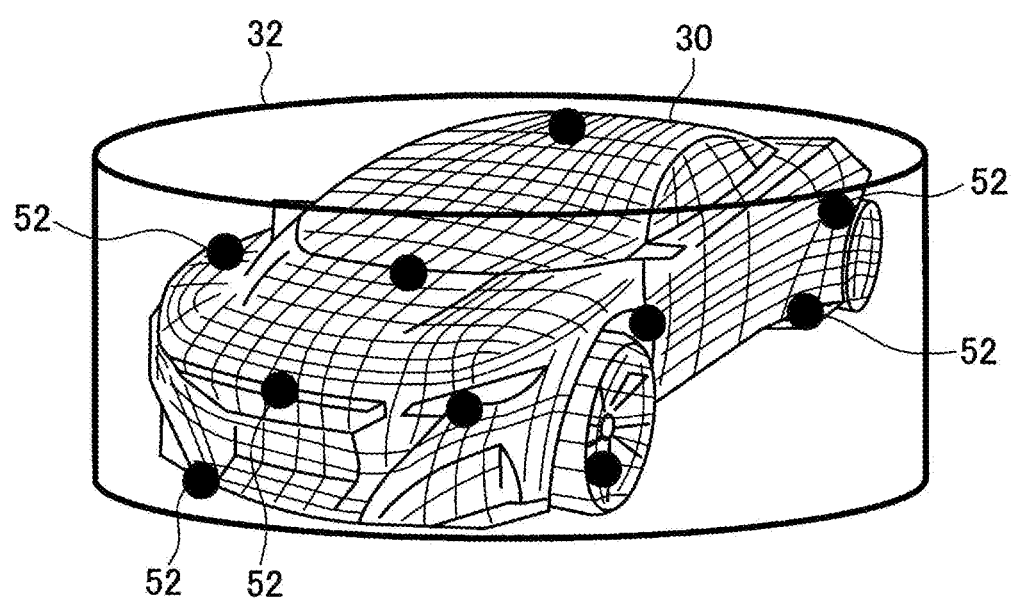
FIG. 7 is a diagram for explaining a case in which a large number of download startable points are disposed on the 3D model data in a second determination method for the download starting point according to the present embodiment.
Figure 8:
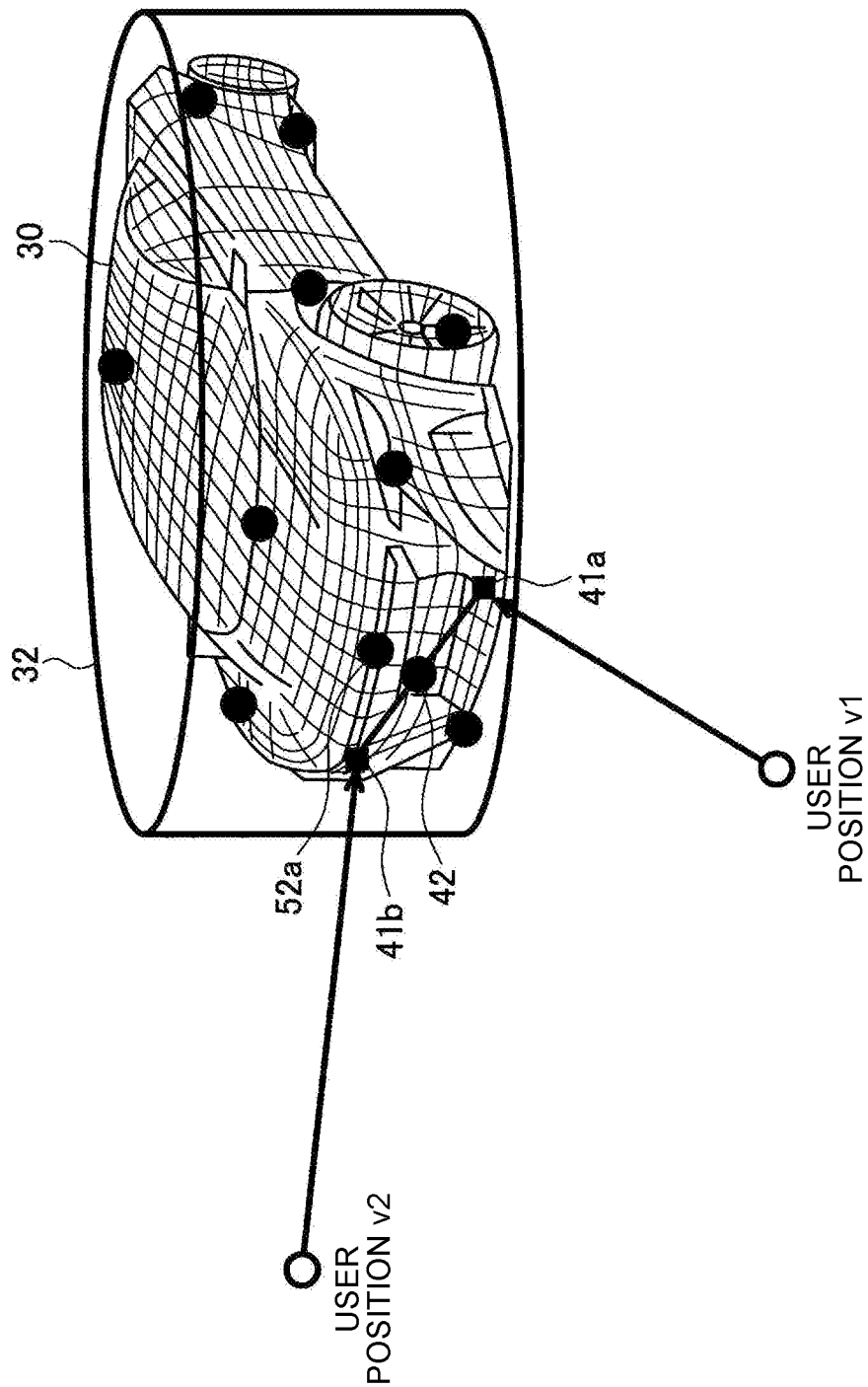
FIG. 8 is a diagram for explaining determination of the download starting point by referring to a download startable point in the second determination method for the download starting point.

The following describes a second determination method for the download starting point according to the present embodiment with reference to FIG. 7 to FIG. 8.

FIG. 7 is a diagram for explaining a case in which a large number of download startable points 52 are disposed on the 3D model data in the second determination method for the download starting point. The download startable points 52 may be disposed on the size outline FIG. 32 of the 3D model data 30, or may be disposed on the 3D model data 30 therein. The download startable points 52 may be disposed at equal points on the 3D model data 30, or may be disposed for respective parts of the 3D model data 30, for example.

FIG. 8 is a diagram for explaining determination of the download starting point by referring to the download startable point in the second determination method for the download starting point. As illustrated in FIG. 8, the download starting point determination unit 201 estimates the gazing points 41a and 41b on the size outline FIG. 32 of the 3D model data 30 based on the positions and the sight line directions of the users and the display position of the 3D model data 30. Alternatively, the size outline FIG. 32 of the 3D model data 30 may be transmitted to the information processing terminal 1 side, and the gazing point 41 may be estimated on the information processing terminal 1 side.

Subsequently, the download starting point determination unit 201 obtains the centroid of the gazing points 41a and 41b (user reference point 42). The download starting point determination unit 201 then determines, to be the download starting point, a download startable point 52a closest to the user reference point 42 among a large number of download startable points 52 defined on the 3D model data. Due to this, the users can preferentially share a portion more important for viewing experience to start to comfortably view the data.

Depending on a type of a band for data communication with the information processing terminal 1, an amount of the 3D model data to be transmitted, and the like, the download starting point determination unit 201 may determine three or four download startable points in the periphery of the download startable point 52a to be download starting points if influence thereof on a processing load or a download time is small. In this case, the download startable point 52a and the three or four download startable points in the periphery thereof are preferentially started to be downloaded.

Regarding Download Progressing Direction

The transmission data determination unit 202 according to the present embodiment determines data to be successively transmitted (downloaded) starting from the determined download starting point. The download progressing direction at this point may be directions radially and uniformly spreading from the download starting point, for example.

Figure 9:
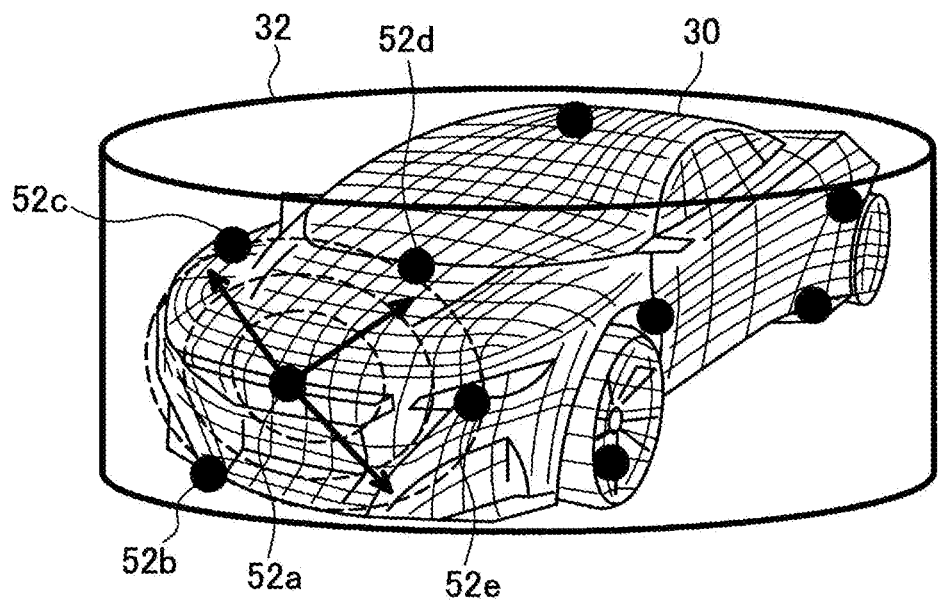
FIG. 9 is a diagram for explaining determination of a download progressing direction using the download startable point according to the present embodiment.

In a case in which a large number of download startable points 52 are set to the 3D model data, the transmission data determination unit 202 may determine the download progressing direction to be directions including download startable points in the periphery of the determined download starting point. FIG. 9 is a diagram for explaining determination of the download progressing direction using the download startable point according to the present embodiment.

As illustrated in FIG. 9, the transmission data determination unit 202 may determine the download progressing direction to be directions including download startable points 52b to 52e in the periphery spreading radially from the determined download starting point (download startable point 52a). Even in a case in which a large number of download startable points 52 are set to the 3D model data, the transmission data determination unit 202 may determine the download progressing direction to be directions spreading radially and uniformly from the determined download starting point.

The transmission data determination unit 202 may determine the download progressing direction by referring to a high-frequency gazing point (for example, the gazing point at which the number of data views is equal to or larger than a predetermined value) that is calculated based on a viewing history or an operation history of another user associated with the 3D model data. Due to this, it is possible to preferentially download a place that may be viewed with high possibility by the user after moving.

Figure 10:
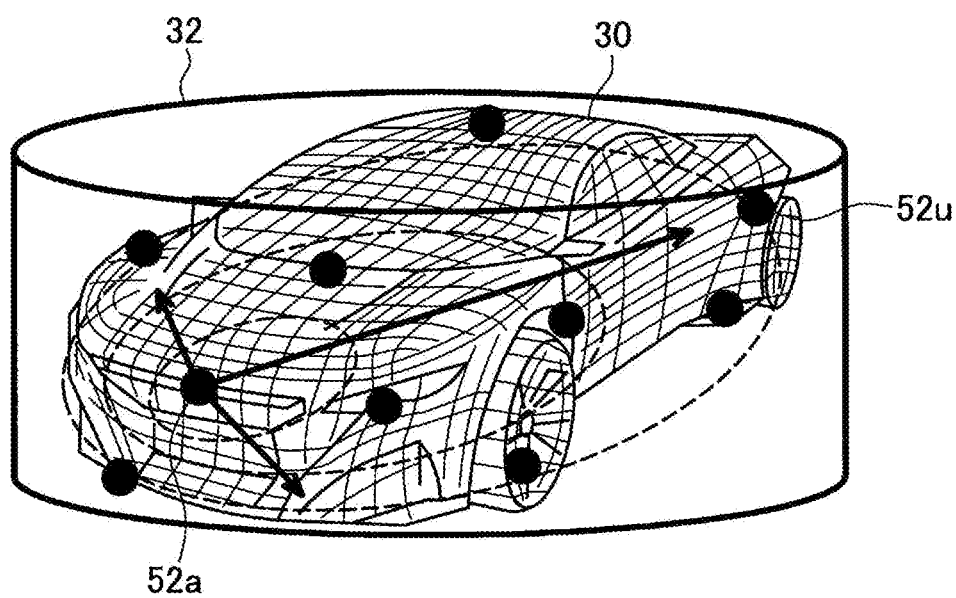
FIG. 10 is a diagram for explaining determination of the download progressing direction using a high-frequency gazing point according to the present embodiment.

FIG. 10 is a diagram for explaining determination of the download progressing direction using the high-frequency gazing point according to the present embodiment. As illustrated in FIG. 10, in a case in which a high-frequency gazing point 52u is calculated based on the viewing history of the 3D model data, the transmission data determination unit 202 may determine the download progressing direction to be a direction including the high-frequency gazing point 52u from the download starting point (download startable point 52a).

As the operation history, exemplified is information about an operation of opening a door of "vehicle" as the 3D model data, opening a trunk thereof, for example, and an operation of the 3D model data such as "button" or "PC" (what is called a virtual button, a virtual PC, and the like). In a case in which there is a high possibility that a door or a trunk is opened (in a case in which the high-frequency gazing point is an inner part of the door or the trunk), the transmission data determination unit 202 determines the download progressing direction so that display data of content inside the door or the trunk is preferentially transmitted. Alternatively, the transmission data determination unit 202 may determine the download progressing direction to be a direction toward the high-frequency gazing point and directions including download startable points in the periphery.

In a case in which the user moves and a moving distance of the user is within a predetermined range, the transmission data determination unit 202 may determine the download processing direction to be a direction progressing toward a point at which the sight line direction intersects with the size outline figure or the 3D model data (gazing point), or a centroid of new gazing points of the users (user reference point) based on a new position and sight line direction of the user.

The transmission data determination unit 202 may also determine not to transmit display data from a direction in which the user cannot move, or to transmit such display data lastly based on the display position of the 3D model data. For example, in a case in which the 3D model data of "vehicle" is displayed near a wall, the user cannot view it from the wall side, so that the display data on the wall side is not required, or has low priority.

Determination of Plurality of Download Starting Points

Figure 11:
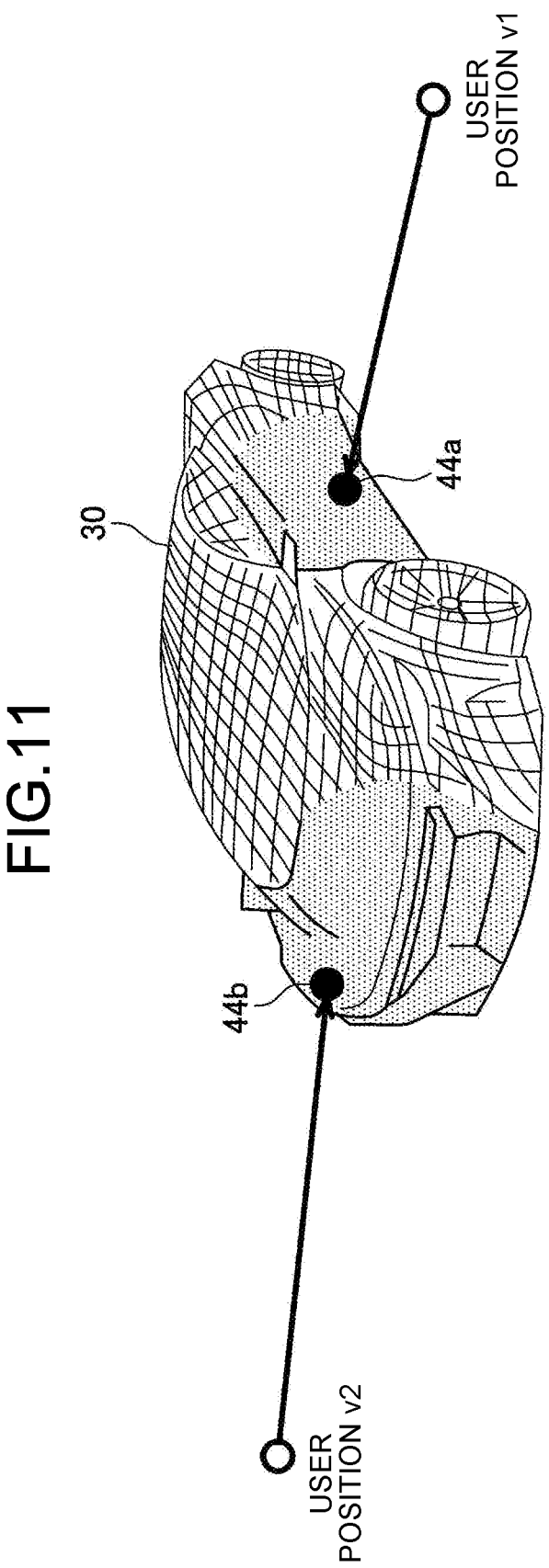
FIG. 11 is a diagram for explaining determination of a plurality of download starting points according to the present embodiment.

There has been described the processing of determining the download starting point based on the positions and sight line directions of the users and the display position of the 3D model data to be shared and viewed by the users, the processing performed by the download starting point determination unit 201 according to the present embodiment. The processing may make it a condition that the users are close to each other in some degree (a distance between the users is within a certain range), the gazing point of each user is within a predetermined distance, a part including the gazing point of each user is the same, the gazing point of each user is present in the same direction of the 3D model data (a front side, a side surface, a rear side, or the like), for example. That is, as illustrated in FIG. 11, for example, in a case in which the positions v1 and v2 and the sight line directions of the users who share and view the same 3D model data 30 are largely different, a common portion is not present (or the number of common portions is small) in a viewable range of the 3D model data, so that it is difficult to comfortably view a portion that can be viewed by both users without a waiting time even when the centroid of the gazing points 44a and 44b of the users is caused to be the download starting point. Thus, in a case in which the condition described above is not satisfied, as illustrated in FIG. 11, the download starting point determination unit 201 according to the present embodiment may determine the gazing points 44a and 44b of the users to be the download starting points, respectively. Due to this, download is started from each of the gazing points.

As illustrated in FIG. 11, in a case in which the gazing points 44a and 44b of the users are respectively determined to be the download starting points, the transmission data determination unit 202 may determine a download direction to be a direction toward the other download starting point.

3. Operation Processing

Figure 12:
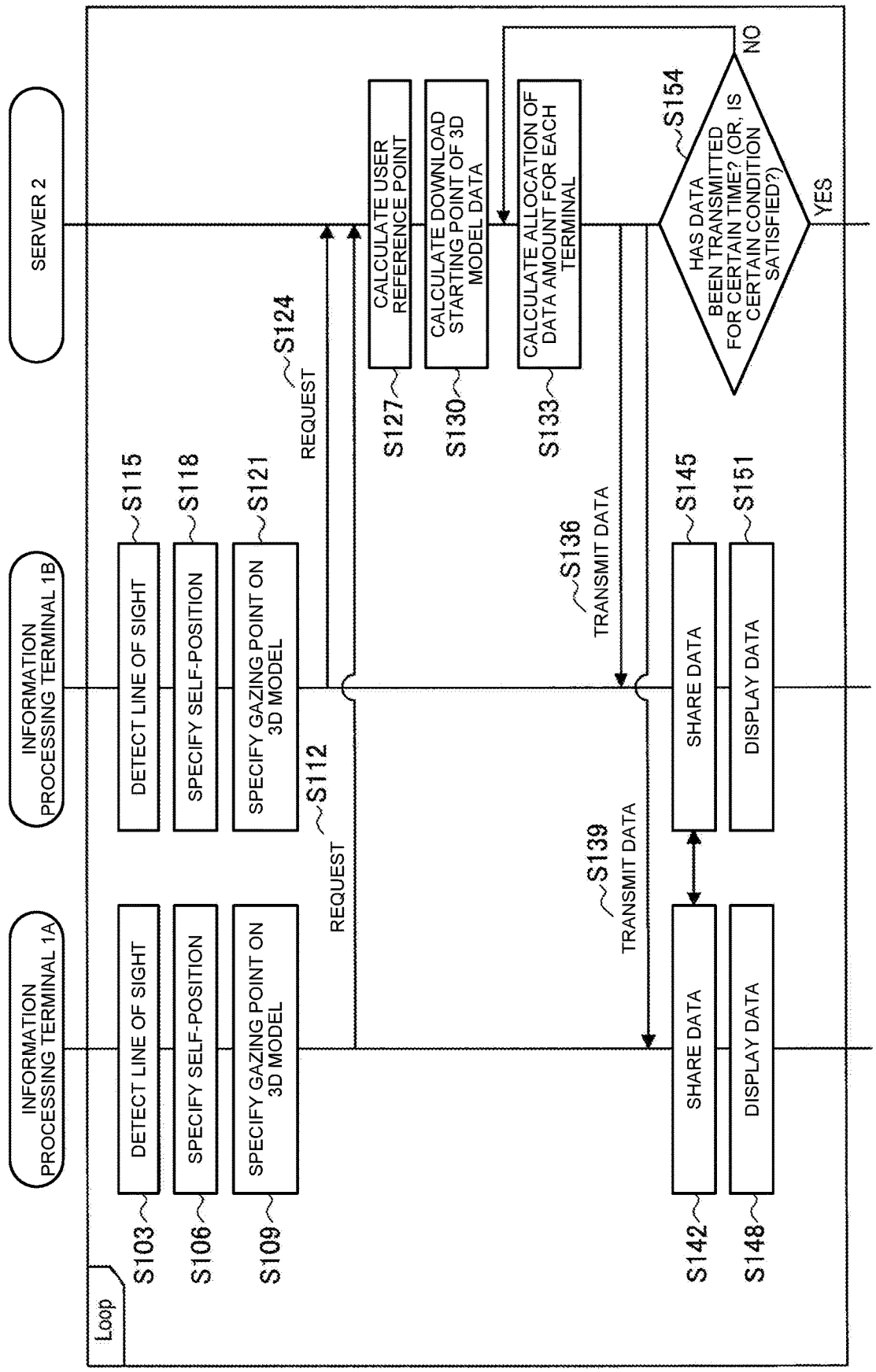
FIG. 12 is a sequence diagram illustrating a processing procedure of the information processing system according to the present embodiment.

The following specifically describes operation processing performed by the information processing system according to the present embodiment with reference to FIG. 12. FIG. 12 is a sequence diagram illustrating a processing procedure of the information processing system according to the present embodiment.

As illustrated in FIG. 12, each of the information processing terminal 1A and the information processing terminal 1B detects a line of sight of the user (Steps S103 and S105), specifies a self-position (Steps S106 and S118), and specifies a gazing point of the user on the 3D model (Steps S109 and S121). The gazing point of the user may be specified on the server 2 side.

Next, the information processing terminal 1A and the information processing terminal 1B transmit a request to display the 3D model data to the server 2 (Steps S112 and S124). Specifically, the information processing terminal 1A and the information processing terminal 1B transmit, for example, the sight line information of the user, the specified positional information of the user, and the gazing point information to the server 2. The information processing terminal 1A and the information processing terminal 1B may transmit terminal information at the same time. The terminal information includes information about a processing capacity of the terminal information and data band information, which are used for calculating allocation of the data amount described later.

The request transmitted from the information processing terminal 1 to the server 2 may include an offset from an object to be downloaded (that is, the 3D model data) and parameters such as vertical or a horizontal angle (parameters of three-dimensional position information and the sight line direction) as described below.

Format example of access URL
https:// . . . ?offset x=100 &offset y=200 &angle v=125 &angle h=90 &multipoint=0

Subsequently, the server 2 calculates the user reference point based on the gazing point information of the users (Step S127).

Next, the server 2 calculates the download starting point of the 3D model data (Step S130).

Next, the server 2 calculates allocation of the data amount to be transmitted to each of the information processing terminals 1A and 1B based on the calculated download starting point (Step S133).

Subsequently, the server 2 transmits, to each of the information processing terminals 1A and 1B, part of the 3D model data that is determined based on the download starting point (Steps S136 and S139).

Next, the information processing terminals 1A and 1B perform share processing of the received data (Steps S142 and S145).

Subsequently, the information processing terminals 1A and 1B perform display processing of the 3D model data (Steps S148 and S151). The data starts to be downloaded from a portion viewed by the users in common on the information processing terminals 1A and 1B side, so that the waiting time is shortened, and the users are enabled to immediately view the 3D model data.

On the other hand, the server 2 determines whether a certain time has elapsed, or a certain condition is satisfied (Step S154). The certain time is a certain time from the time when the data starts to be transmitted, for example (for example, several seconds, several tens of seconds, or the like). The certain condition is a case in which the user moves and the sight line direction is largely changed, for example. To avoid frequent update of the download starting point, the pieces of processing from Steps S133 to S151 described above are repeated until the certain time elapses or the certain condition is satisfied, and control is performed so as to transmit the data preferentially from the download starting point and successively transmit peripheral data.

In a case in which the certain time has elapsed or the certain condition is satisfied (Yes at Step S154), the processing from Step S103 described above is repeated. That is, a new download starting point is calculated, and transmission control is continuously performed for the rest pieces of the 3D model data preferentially from the new download starting point.

An example of the operation processing according to the present embodiment is described above. The operation processing illustrated in FIG. 12 is merely an example, and the present disclosure is not limited to the example illustrated in FIG. 12. For example, the present disclosure is not limited to the order of the steps illustrated in FIG. 12. At least some of the steps may be performed in parallel, or may be performed in the reverse order. For example, the processing at Step S103 and the processing at Step S106 may be performed in parallel, or may be performed in the reverse order.

All of the pieces of processing illustrated in FIG. 12 are not necessarily performed. For example, allocation calculation processing at Step S133 and data share at Steps S142 and S145 may be skipped.

All of the pieces of processing illustrated in FIG. 12 are not necessarily performed by the device illustrated in FIG. 12. For example, the pieces of processing at Step S109 and Step S121 may be performed by the server 2 or an intermediate server (not illustrated).

The data may be transmitted to any of the information processing terminals 1 of a sharing person without performing allocation calculation at Step S133, and the data may be caused to be shared by the information processing terminal 1 and the information processing terminal 1 of the other sharing person.

By way of example, the two information processing terminals 1A and 1B are used in the present embodiment, but the present embodiment is not limited thereto. The number of information processing terminals 1 may be three or more (that is, the number of sharing people may be three or more).

4. Hardware Configuration

Figure 13:
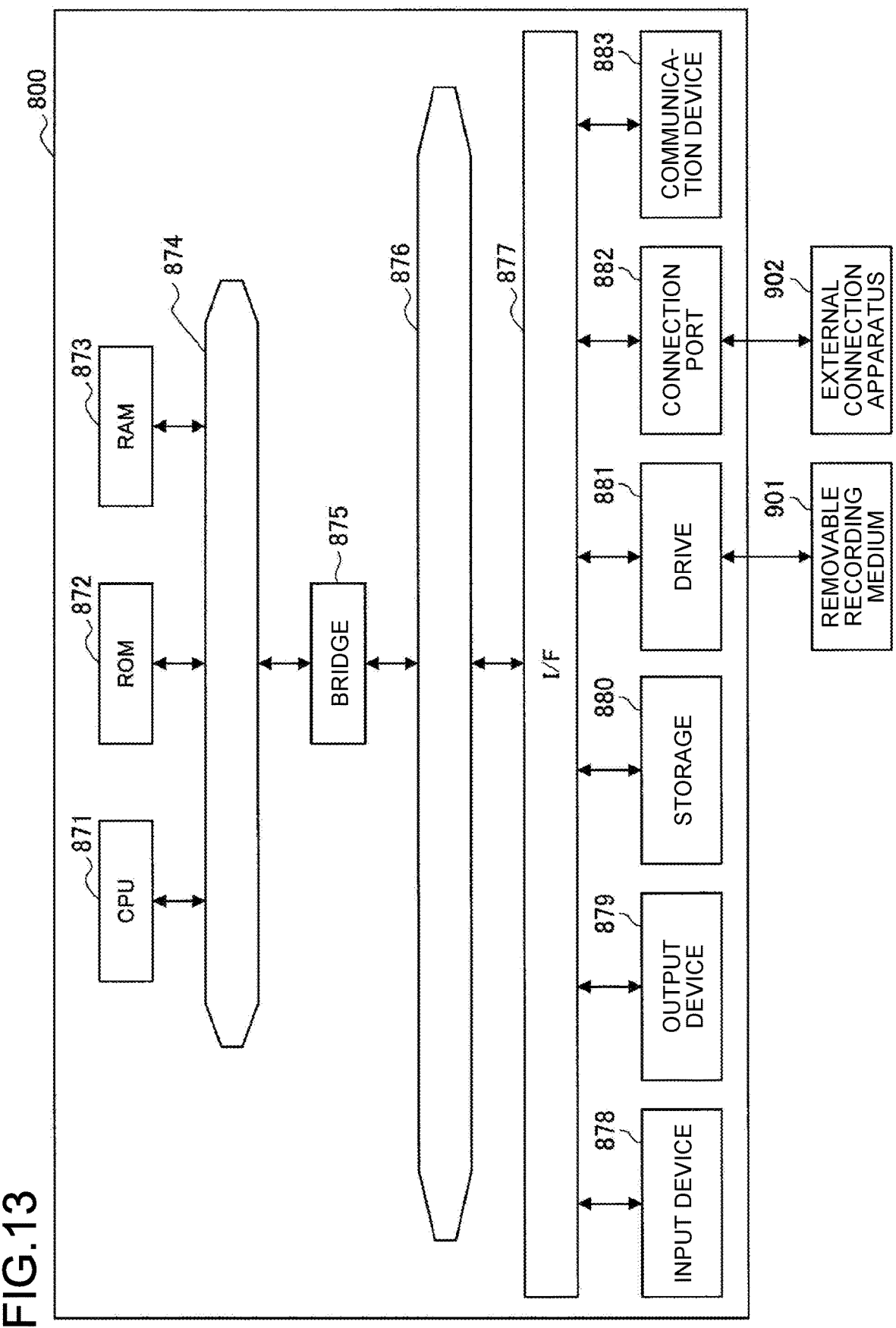
FIG. 13 is a block diagram illustrating a hardware configuration example of an information processing device according to one embodiment of the present disclosure.

Next, the following describes a hardware configuration example of the information processing device common to the information processing terminal 1 and the server 2 according to one embodiment of the present disclosure. FIG. 13 is a block diagram illustrating a hardware configuration example of the information processing device common to the information processing terminal 1 and the server 2 according to one embodiment of the present disclosure. In FIG. 13, the information processing device 800 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration described herein is merely an example, and part of constituent elements thereof may be omitted. The hardware configuration may further include a constituent element other than the constituent elements described herein.

CPU 871

The CPU 871 functions, for example, as an arithmetic processing device or a control device, and controls the entire or part of operations of the constituent elements based on various computer programs recorded in the ROM 872, the RAM 873, the storage 880, or a removable recording medium 901.

Specifically, the CPU 871 implements the operations of the control unit 12 in the information processing terminal 1.

ROM 872, RAM 873

The ROM 872 is a unit that stores a computer program read by the CPU 871, data used for an arithmetic operation, and the like. For example, the RAM 873 temporarily or permanently stores a computer program read by the CPU 871, various parameters that vary as appropriate at the time when the computer program is executed, and the like.

Host Bus 874, Bridge 875, External Bus 876, Interface 877

The CPU 871, the ROM 872, and the RAM 873 are connected to each other via the host bus 874 that can perform fast data transmission, for example. On the other hand, the host bus 874 is connected, via the bridge 875, to the external bus 876 the data transmission speed of which is relatively low, for example. The external bus 876 is connected to various constituent elements via the interface 877.

Input Device 878

As the input device 878, for example, a mouse, a keyboard, a touch panel, a button, a switch, and a lever are used. Additionally, as the input device 878, a remote controller (hereinafter, referred to as a remote control) may be used, the remote control being able to transmit a control signal by utilizing infrared rays or other radio waves. The input device 878 may also include a voice input device such as a microphone.

Output Device 879

The output device 879 is, for example, a device that can visually or aurally notifies the user of acquired information, that is, a display device such as a Cathode Ray Tube (CRT), an LCD, or an organic EL, an audio output device such as a speaker and a headphone, a printer, a cellular telephone, a facsimile, or the like. The output device 879 according to the present disclosure includes various vibration devices that can output tactile stimulation.

Storage 880

The storage 880 is a device for storing various kinds of data. As the storage 880, for example, used are magnetic storage device such as a hard disk drive (HDD), a semiconductor storage device, an optical storage device, a magneto-optical storage device, or the like.

Drive 881

The drive 881 is, for example, a device that reads out information recorded in the removable recording medium 901 such as a magnetic disc, an optical disc, a magneto-optical disc, or a semiconductor memory, or writes information into the removable recording medium 901.

Removable Recording Medium 901

The removable recording medium 901 is, for example, a DVD medium, a Blu-ray (registered trademark) medium, an HD DVD medium, various kinds of semiconductor storage media, or the like. Obviously, for example, the removable recording medium 901 may be an IC card on which a contactless IC chip is mounted, an electronic appliance, or the like.

Connection Port 882

The connection port 882 is, for example, a port for connecting an external connection appliance 902 such as a Universal Serial Bus (USB) port, an IEEE1394 port, a Small Computer System Interface (SCSI), an RS-232C port, or an optical audio terminal.

External Connection Appliance 902

The external connection appliance 902 is, for example, a printer, a portable music player, a digital camera, a digital video camera, an IC recorder, or the like.

Communication Device 883

The communication device 883 is a communication device for making a connection to a network, and examples thereof include a communication card for a wired or wireless LAN, Wi-Fi (registered trademark), Bluetooth (registered trademark), or Wireless USB (WUSB), a router for optical communication, a router for Asymmetric Digital Subscriber Line (ADSL), a modem for various kinds of communication, or the like.

5. Conclusion

The preferred embodiment of the present disclosure has been described above in detail with reference to the attached drawings, but the present technique is not limited thereto. A person ordinarily skilled in the art of the present disclosure may obviously conceive various examples of variations or modifications without departing from the technical idea disclosed in CLAIMS, and these variations or modifications are obviously encompassed by the technical scope of the present disclosure.

For example, it is possible to create a computer program for causing hardware such as a CPU, a ROM, and a RAM incorporated in the information processing terminal 1 described above to function as the information processing terminal 1. Additionally, a computer-readable storage medium storing the computer program is provided.

The effects described in the present description are provided as merely explanations or examples, and are not provided as limitation. That is, the technique according to the present disclosure can exhibit other effects that are obviously conceivable by those skilled in the art based on the description herein in addition to or in place of the effects described above.

The present technique can also employ the following configurations.

(1)

An information processing device comprising:
a control unit configured to perform control for determining a transmission starting point of three-dimensional image information based on
positional information and sight line information of a first user,
positional information and sight line information of a second user, and
display position information of the three-dimensional image information that is shared and viewed by the first user and the second user.

(2)

The information processing device according to (1), wherein the control unit performs control for transmitting the three-dimensional image information to an information processing terminal preferentially from the determined transmission starting point.

(3)

The information processing device according to (1) or (2), wherein
the control unit
estimates a first gazing point of the first user in the three-dimensional image information based on the positional information and the sight line information of the first user and the display position information of the three-dimensional image information,
estimates a second gazing point of the second user in the three-dimensional image information based on the positional information and the sight line information of the second user and the display position information of the three-dimensional image information, and
determines a centroid of the first gazing point and the second gazing point to be the transmission starting point.

(4)

The information processing device according to (1) or (2), wherein
the three-dimensional image information includes size outline information, and
the control unit
estimates a first gazing point of the first user in the size outline information based on the positional information and the sight line information of the first user and the display position information of the three-dimensional image information,
estimates a second gazing point of the second user in the size outline information based on the positional information and the sight line information of the second user and the display position information of the three-dimensional image information, and
determines an apex of the three-dimensional image information closest to a centroid of the first gazing point and the second gazing point to be the transmission starting point.

(5)

The information processing device according to (3) or (4), wherein
the three-dimensional image information includes a reference point set in advance, and
the control unit rotates the three-dimensional image information to cause the reference point to be closest to the centroid of the first gazing point and the second gazing point, and determines the centroid to be the transmission starting point.

(6)

The information processing device according to (1) or (2), wherein
the three-dimensional image information includes a plurality of transmission startable points set in advance, and
the control unit
estimates a first gazing point of the first user in the three-dimensional image information or size outline information of the three-dimensional image information based on the positional information and the sight line information of the first user and the display position information of the three-dimensional image information,
estimates a second gazing point of the second user in the three-dimensional image information or the size outline information based on the positional information and the sight line information of the second user and the display position information of the three-dimensional image information, and
determines a transmission startable point closest to a centroid of the first gazing point and the second gazing point among the transmission startable points to be the transmission starting point.

(7)

The information processing device according to any one of (1) to (6), wherein the control unit performs control for successively transmitting, to an information processing terminal, the three-dimensional image information in directions radially and uniformly spreading from the determined transmission starting point.

(8)

The information processing device according to any one of (1) to (6), wherein the control unit performs control for successively transmitting, to an information processing terminal, the three-dimensional image information in a direction including a plurality of transmission startable points in periphery of the transmission starting point that are set in advance in the three-dimensional image information, from the determined transmission starting point.

(9)

The information processing device according to any one of (1) to (6), wherein
the control unit
estimates a third gazing point in the three-dimensional image information based on at least one of a viewing history and an operation history of another user related to the three-dimensional image information, and
performs control for successively transmitting, to an information processing terminal, the three-dimensional image information in a direction including the third gazing point from the determined transmission starting point.

(10)

The information processing device according to any one of (1) to (6), wherein
the control unit
calculates allocation of data to be transmitted to a first information processing terminal of the first user and a second information processing terminal of the second user, and
performs control for transmitting, at the time of transmitting the three-dimensional image information to the first information processing terminal and the second information processing terminal preferentially from the determined transmission starting point, different pieces of data for the first information processing terminal and the second information processing terminal.

(11)

The information processing device according to any one of (1) to (10), wherein
the control unit
determines whether a distance between the first user and the second user is within a predetermined range, and
in a case in which the distance is within the predetermined range, performs determination control for the transmission starting point based on the positional information and the sight line information of the first user, the positional information and the sight line information of the second user, and the display position information of the three-dimensional image information.

(12)

An information processing method performed by a processor, the information processing method comprising:
performing control for determining a transmission starting point of three-dimensional image information based on
positional information and sight line information of a first user,
positional information and sight line information of a second user, and
display position information of the three-dimensional image information that is shared and viewed by the first user and the second user.

(13)

A computer program for causing a computer to function as a control unit configured to perform control for determining a transmission starting point of three-dimensional image information based on
positional information and sight line information of a first user,
positional information and sight line information of a second user, and
display position information of the three-dimensional image information that is shared and viewed by the first user and the second user.

REFERENCE SIGNS LIST

1 Information processing terminal
2 Server
11 Sensor unit
12 Control unit
13 Display unit
14 Speaker
15 Communication unit
16 Operation input unit
17 Storage unit
20 Control unit
21 Communication unit
22 Storage unit
110 Outward camera
111 Inward camera
112 Microphone
113 Gyro sensor
114 Acceleration sensor
115 Azimuth sensor
116 Position measuring unit
117 Biosensor
120 Sight line detection unit
122 Self-position specification unit
124 Share control unit
126 Display processing unit
201 Download starting point determination unit
202 Transmission data determination unit
203 Data transmission control unit

The invention claimed is:

1. An information processing device comprising:
a control unit configured to perform control for determining a transmission starting point of three-dimensional image information, based on
first positional information in the three-dimensional image information estimated based on sight line information of a first user,
second positional information in the three-dimensional image information estimated based on sight line information of a second user, and
display position information,
wherein the displayed position information includes a position of the three-dimensional image information that is shared and viewed by the first user and the second user,
wherein the transmission starting point of the three-dimensional image information is common to the first user and the second user, and
wherein the control unit is implemented via at least one processor.

2. The information processing device according to claim 1, wherein the control unit is further configured to perform control for transmitting the three-dimensional image information to an information processing terminal preferentially from the determined transmission starting point.

3. The information processing device according to claim 1, wherein the control unit is further configured to
estimate a first gazing point of the first user in the three-dimensional image information based on the first positional information and the sight line information of the first user and the display position information of the three-dimensional image information,
estimate a second gazing point of the second user in the three-dimensional image information based on the second positional information and the sight line information of the second user and the display position information of the three-dimensional image information, and
determine a centroid of the first gazing point and the second gazing point to be the transmission starting point.

4. The information processing device according to claim 3, wherein the three-dimensional image information includes a reference point set in advance, and
the control unit is further configured to
rotate the three-dimensional image information to cause the reference point to be closest to the centroid of the first gazing point and the second gazing point, and
determine the centroid to be the transmission starting point.

5. The information processing device according to claim 1, wherein the three-dimensional image information includes size outline information, and
the control unit is further configured to:
estimate a first gazing point of the first user in the size outline information based on the first positional information and the sight line information of the first user and the display position information of the three-dimensional image information,
estimate a second gazing point of the second user in the size outline information based on the second positional information and the sight line information of the second user and the display position information of the three-dimensional image information, and determine an apex of the three-dimensional image information closest to a centroid of the first gazing point and the second gazing point to be the transmission starting point.

6. The information processing device according to claim 1, wherein the three-dimensional image information includes a plurality of transmission startable points set in advance, and
the control unit is further configured to
estimate a first gazing point of the first user in the three-dimensional image information or size outline information of the three-dimensional image information based on the first positional information and the sight line information of the first user and the display position information of the three-dimensional image information,
estimate a second gazing point of the second user in the three-dimensional image information or the size outline information based on the second positional information and the sight line information of the second user and the display position information of the three-dimensional image information, and
determine a transmission startable point closest to a centroid of the first gazing point and the second gazing point among the transmission startable points to be the transmission starting point.

7. The information processing device according to claim 1, wherein the control unit is further configured to perform control for successively transmitting, to an information processing terminal, the three-dimensional image information in directions radially and uniformly spreading from the determined transmission starting point.

8. The information processing device according to claim 1, wherein the control unit is further configured to perform control for successively transmitting, to an information processing terminal, the three-dimensional image information in a direction including a plurality of transmission startable points in periphery of the transmission starting point that are set in advance in the three-dimensional image information, from the determined transmission starting point.

9. The information processing device according to claim 1, wherein the control unit is further configured to
estimate a third gazing point in the three-dimensional image information based on at least one of a viewing history and an operation history of another user related to the three-dimensional image information, and
perform control for successively transmitting, to an information processing terminal, the three-dimensional image information in a direction including the third gazing point from the determined transmission starting point.

10. The information processing device according to claim 1, wherein the control unit is further configured to
calculate allocation of data to be transmitted to a first information processing terminal of the first user and a second information processing terminal of the second user, and
perform control for transmitting, at a time of transmitting the three-dimensional image information to the first information processing terminal and the second information processing terminal preferentially from the determined transmission starting point, different pieces of data for the first information processing terminal and the second information processing terminal.

11. The information processing device according to claim 1, wherein the control unit is further configured to
determine whether a distance between the first user and the second user is within a predetermined range, and
in a case in which the distance is within the predetermined range, perform determination control for the transmission starting point based on the first positional information and the sight line information of the first user, the second positional information and the sight line information of the second user, and the display position information of the three-dimensional image information.

12. An information processing method performed by a processor, the information processing method comprising:
performing control for determining a transmission starting point of three-dimensional image information, based on
first positional information in the three-dimensional image information estimated based on sight line information of a first user,
second positional information in the three-dimensional image information estimated based on sight line information of a second user, and
display position information,
wherein the displayed position information includes a position of the three-dimensional image information that is shared and viewed by the first user and the second user, and
wherein the transmission starting point of the three-dimensional image information is common to the first user and the second user.

13. A non-transitory computer-readable medium having embodied thereon a program, which when executed by a computer causes the computer to execute a method, the method comprising:
performing control for determining a transmission starting point of three-dimensional image information, based on
first positional information in the three-dimensional image information estimated based on sight line information of a first user,
second positional information in the three-dimensional image information estimated based on sight line information of a second user, and
display position information,
wherein the displayed position information includes a position of the three-dimensional image information that is shared and viewed by the first user and the second user, and
wherein the transmission starting point of the three-dimensional image information is common to the first user and the second user.

* * * * *